United States Patent
Song et al.

(10) Patent No.: US 12,344,122 B2
(45) Date of Patent: Jul. 1, 2025

(54) LOW-VOLTAGE BATTERY CHARGING SYSTEM AND METHOD

(71) Applicant: SHENZHEN YINWANG INTELLIGENT TECHNOLOGIES CO., LTD., Shenzhen (CN)

(72) Inventors: Tianzhu Song, Shanghai (CN); Jian Sun, Shanghai (CN); Hui Wang, Shanghai (CN); Lulu Yang, Shanghai (CN)

(73) Assignee: Shenzhen Yinwang Intelligent Technologies Co., Ltd., Shenzhen (CN)

( * ) Notice: Subject to any disclaimer, the term of this patent is extended or adjusted under 35 U.S.C. 154(b) by 0 days.

(21) Appl. No.: 18/179,794

(22) Filed: Mar. 7, 2023

(65) Prior Publication Data
US 2023/0202343 A1  Jun. 29, 2023

Related U.S. Application Data

(63) Continuation of application No. PCT/CN2020/114005, filed on Sep. 8, 2020.

(51) Int. Cl.
*B60L 53/20* (2019.01)
*B60L 58/14* (2019.01)

(52) U.S. Cl.
CPC ............ *B60L 58/14* (2019.02); *B60L 53/20* (2019.02); *B60L 2210/10* (2013.01); *B60L 2240/547* (2013.01)

(58) Field of Classification Search
CPC .. B60L 2210/10; B60L 2210/12; B60L 58/12; B60L 58/14; B60L 53/20;
(Continued)

(56) References Cited

U.S. PATENT DOCUMENTS

| 10,444,024 B2 | 10/2019 | Yoshino et al. | |
| 2013/0127400 A1* | 5/2013 | Oh | B60L 58/20 320/104 |
| 2015/0349392 A1* | 12/2015 | Smith | H01M 10/613 429/50 |

FOREIGN PATENT DOCUMENTS

| CN | 104827921 A | 8/2015 |
| CN | 105978099 A | 9/2016 |

(Continued)

OTHER PUBLICATIONS

Translation of CN 110315978 (Year: 2019).*
(Continued)

*Primary Examiner* — Elim Ortiz
(74) *Attorney, Agent, or Firm* — Fish & Richardson P.C.

(57) ABSTRACT

This application relates to the technical field of electric vehicles, and in particular, to charging systems and methods. An example charging system includes: a low-voltage battery capable of supplying power to a low-voltage electrical device of a vehicle; a power battery module; a direct current-to-direct current (DC-DC) converter capable of receiving a voltage supplied by the power battery module in response to at least that a positive relay and a negative relay of the power battery module are closed, and converting the voltage into a charging voltage of the low-voltage battery to charge the low-voltage battery; and a DC-DC controller electrically connected to the low-voltage battery and capable of monitoring a voltage of the low-voltage battery in response to at least that the vehicle is in a dormant state.

20 Claims, 4 Drawing Sheets

(58) Field of Classification Search
CPC .... B60L 2240/547; B60L 58/20; B60L 53/00; B60L 2240/545; H02J 2310/48; H02J 7/0048; H02J 7/00306; H02J 7/0047; H02J 7/342; Y02T 90/14; Y02T 10/70; Y02T 10/7072; Y02T 90/16; Y02T 10/72; Y02T 90/12; Y02T 10/62; Y02E 60/10
USPC ......... 307/9.1, 10.1; 318/139; 320/134, 109; 180/65.28, 65.1, 65.285; 701/22
See application file for complete search history.

(56) References Cited

FOREIGN PATENT DOCUMENTS

| CN | 205811597 U | | 12/2016 | |
|---|---|---|---|---|
| CN | 107994631 A | | 5/2018 | |
| CN | 108001277 A | | 5/2018 | |
| CN | 108039526 A | | 5/2018 | |
| CN | 105978099 B | * | 11/2018 | .............. B60L 58/14 |
| CN | 109703367 A | | 5/2019 | |
| CN | 110182154 A | | 8/2019 | |
| CN | 110315978 A | * | 10/2019 | |
| CN | 110641284 A | | 1/2020 | |
| EP | 3549809 A1 | | 10/2019 | |
| KR | 20170067186 A | | 6/2017 | |
| KR | 20180057191 A | | 5/2018 | |
| WO | 2017119926 A1 | | 7/2017 | |

OTHER PUBLICATIONS

Office Action in Chinese Appln. No. 202080004224.3, dated Aug. 27, 2021, 12 pages (with English translation).
International Search Report and Written Opinion in International Appln. No. PCT/CN2020/114005, mailed on May 27, 2021, 17 pages (with English translation).
Extended European Search Report in European Appln No. 20952691.2, dated Oct. 30, 2023, 7 pages.

* cited by examiner

LOW-VOLTAGE BATTERY CHARGING SYSTEM AND METHOD

CROSS-REFERENCE TO RELATED APPLICATIONS

This application is a continuation of International Application No. PCT/CN2020/114005, filed on Sep. 8, 2020, the disclosure of which is hereby incorporated by reference in its entirety.

TECHNICAL FIELD

This application relates to the technical field of electric vehicles, and in particular, to a low-voltage battery charging system and method.

BACKGROUND

A power source of an electric vehicle usually includes a high-voltage power battery pack and a low-voltage battery. When a vehicle is shut off, a low-voltage battery is used to supply power to a low-voltage electrical device of the vehicle. In other words, to start the vehicle, the low-voltage battery needs to have an appropriate amount of electricity, so that a vehicle startup related controller can operate properly. If power of the low-voltage battery is insufficient to supply an appropriate voltage to the vehicle startup related controller, the vehicle cannot be started. Therefore, how to replenish power for or charge the low-voltage battery is an important issue in the development of electric vehicle technologies.

Currently, a mainstream technology is to directly use a timing function of a telematics box (T-Box) of a vehicle to periodically start the vehicle and regularly charge a low-voltage battery by using a high-voltage power battery pack. The charging strategy of this technology is rigid and may cause a series of problems. For example, when the time to charge the low-voltage battery arrives, the low-voltage battery is charged even if the low-voltage battery has sufficient power, which causes unnecessary power loss. For another example, when the low-voltage battery has insufficient power before the time to charge the low-voltage battery arrives, the vehicle cannot be started, and the low-voltage battery cannot be charged.

In addition, the low-voltage battery can be charged only after the high-voltage power battery pack has completed high-voltage power-on. In an existing solution, there are many high-voltage power-on components, and high-voltage power-on can be performed only when it is determined that none of the high-voltage power-on components is faulty. Therefore, a high-voltage power-on process is cumbersome, and a success rate is low.

SUMMARY

Embodiments of this application provide a low-voltage battery charging system and method, so that a voltage of a low-voltage battery can be monitored in real time when a vehicle is in a dormant state, and the low-voltage battery can be charged when the low-voltage battery has a low voltage.

According to a first aspect, an embodiment of this application provides a low-voltage battery charging system configured in a vehicle. The charging system includes: a low-voltage battery capable of supplying power to a low-voltage electrical device of the vehicle; a power battery module; a direct current-to-direct current converter (DCDC) capable of receiving a voltage supplied by the power battery module when a positive relay and a negative relay of the power battery module are closed, and converting the voltage into a charging voltage of the low-voltage battery, so as to charge the low-voltage battery; and a DC-DC controller electrically connected to the low-voltage battery and capable of monitoring the voltage of the low-voltage battery when the vehicle is in a dormant state, where the DC-DC controller is communicatively connected to a battery management system (BMS) of the vehicle, to wake up the battery management system when the voltage of the low-voltage battery is lower than a first threshold, such that the battery management system closes the positive relay and the negative relay of the power battery module.

In a possible implementation, the DC-DC controller is communicatively connected to a vehicle control unit of the vehicle, to wake up the vehicle control unit when the voltage of the low-voltage battery is lower than the first threshold; the vehicle control unit is configured to: monitor a state of the vehicle, and when the state of the vehicle meets a high-voltage power-on condition, send a high-voltage power-on instruction to the battery management system; and closing, by the battery management system, the positive relay and the negative relay includes: closing, by the battery management system, the positive relay and the negative relay of the power battery module in response to the high-voltage power-on instruction.

In a possible implementation, the power battery module and the direct current-to-direct current converter are housed in a same high-voltage protective enclosure; and the high-voltage power-on condition is that the direct current-to-direct current converter is not faulty, the power battery module is not faulty, and a state of charge (SOC) of the power battery module is higher than a second threshold.

In a possible implementation, the DC-DC controller is electrically connected to the direct current-to-direct current converter to monitor whether the direct current-to-direct current converter becomes faulty.

In a possible implementation, the power battery module is composed of a plurality of power batteries connected in series; and a first power battery in the plurality of power batteries is configured to supply power to the low-voltage electrical device of the vehicle when the voltage of the low-voltage battery is lower than a third threshold.

In a possible implementation, the first power battery is composed of K batteries in the plurality of power batteries connected in series, and a maximum output voltage of the first power battery is less than or equal to a maximum withstand voltage of the low-voltage electrical device, where K≥1, and K is an integer.

In a possible implementation, an electrical switch is disposed between the first power battery and the low-voltage electrical device of the vehicle, where when the voltage of the low-voltage battery is lower than the first threshold, the electrical switch is closed, such that the first power battery supplies power to the low-voltage electrical device of the vehicle.

In a possible implementation, the DC-DC controller is further configured to: when the low-voltage battery is charged, monitor the voltage of the low-voltage battery, so as to monitor whether a fault occurs in charging of the low-voltage battery.

According to a second aspect, an embodiment of this application provides a vehicle, including the charging system provided in the first aspect.

According to a third aspect, an embodiment of this application provides a low-voltage battery charging method applied to a charging system in a vehicle, where the charging system includes a low-voltage battery, a power battery module, a direct current-to-direct current converter (DCDC), and a DC-DC controller. The method includes: monitoring, by the DC-DC controller, a voltage of the low-voltage battery when the vehicle is in a dormant state; and waking up, by the DC-DC controller, a battery management system (BMS) of the vehicle when the voltage of the low-voltage battery is lower than a first threshold, such that the battery management system closes a positive relay and a negative relay of the power battery module, and the power battery module charges the low-voltage battery via the direct current-to-direct current converter.

In a possible implementation, the method further includes: waking up, by the DC-DC controller, a vehicle control unit of the vehicle, such that the vehicle control unit sends a high-voltage power-on instruction to the battery management system when the vehicle meets a high-voltage power-on condition; and closing, by the battery management system, the positive relay and the negative relay of the power battery module includes: closing, by the battery management system, the positive relay and the negative relay of the power battery module in response to the high-voltage power-on instruction.

In a possible implementation, the method further includes: monitoring, by the DC-DC controller, a state of charge (SOC) of the low-voltage battery when the low-voltage battery is in a charging state; and when the state of charge of the low-voltage battery is greater than or equal to a preset charging stop threshold, sending, by the DC-DC controller, charging stop information to the battery management system, such that the battery management system opens the positive relay and the negative relay of the power battery module.

In a possible implementation, the direct current-to-direct current converter and the power battery module are housed in a same high-voltage protective enclosure; and the high-voltage power-on condition is that the direct current-to-direct current converter is not faulty, the power battery module is not faulty, and a state of charge of the power battery module is higher than a second threshold.

In a possible implementation, the power battery module is composed of a plurality of power batteries connected in series; and the method further includes: controlling, by the DC-DC controller, a first power battery to supply power to a low-voltage electrical device of the vehicle when the voltage of the low-voltage battery is lower than a third threshold, where the first power battery is composed of K batteries in the plurality of power batteries connected in series, and a maximum output voltage of the first power battery is less than or equal to a maximum withstand voltage of the low-voltage electrical device of the vehicle, where K≥1, and K is an integer; and the third threshold is lower than the first threshold.

According to the charging system and the charging method provided in embodiments of this application, the voltage of the low-voltage battery can be monitored in real time when the vehicle is in a dormant state; and when the voltage of the low-voltage battery is relatively low, a related controller can be woken up to perform high-voltage power-on, so as to charge the low-voltage battery. In addition, there are few high-voltage power-on conditions, and high-voltage power-on can be performed as soon as possible; and few electrical devices are woken up to charge the low-voltage battery, which can save electric energy. In addition, the redundant battery is provided and may supply electric energy to the low-voltage electrical device when the low-voltage battery has severely insufficient power, thereby avoiding a situation in which the vehicle cannot be started or the related controller of the vehicle cannot be woken up.

DETAILED DESCRIPTION OF EMBODIMENTS

The following describes technical solutions in embodiments of the present invention with reference to the accompanying drawings. It is clear that the described embodiments are merely some rather than all of embodiments of this application.

In the description of this application, an orientation or a position relationship indicated by terms such as "center", "upper", "lower", "front", "back", "left", "right", "vertical", "horizontal", "top", "bottom", "inside", or "outside" is based on an orientation or a position relationship shown in the accompanying drawings and is merely for ease of description of this application and simplification of the description, rather than indicating or implying that an indicated apparatus or element needs to have a particular orientation or be constructed and operated in a particular orientation, and therefore cannot be construed as limiting this application.

In the description of this application, it should be noted that unless otherwise explicitly defined and limited, the terms "mount", "connect", and "connected" shall be understood in a broad sense, for example, may be fixed connection, or may be detachable connection, or may be abutting or integral connection; for persons of ordinary skill in the art, specific meanings of the foregoing terms in this application may be understood based on a specific case.

In the description of this application, the specific features, structures, materials, or characteristics may be combined in an appropriate manner in any one or more of embodiments or examples.

An embodiment of this application provides a low-voltage battery charging system that may be configured in a vehicle, so that a voltage of a low-voltage battery of the vehicle can be monitored when the vehicle is in a dormant state, and charging of the low-voltage battery can be started when it is detected that the low-voltage battery has a low voltage and needs to be charged. Herein, the vehicle may be a battery electric vehicle or a hybrid electric vehicle.

The charging system provided in this embodiment of this application is described below with reference to FIG. 1, FIG. 2, and FIG. 3.

Figure 1:
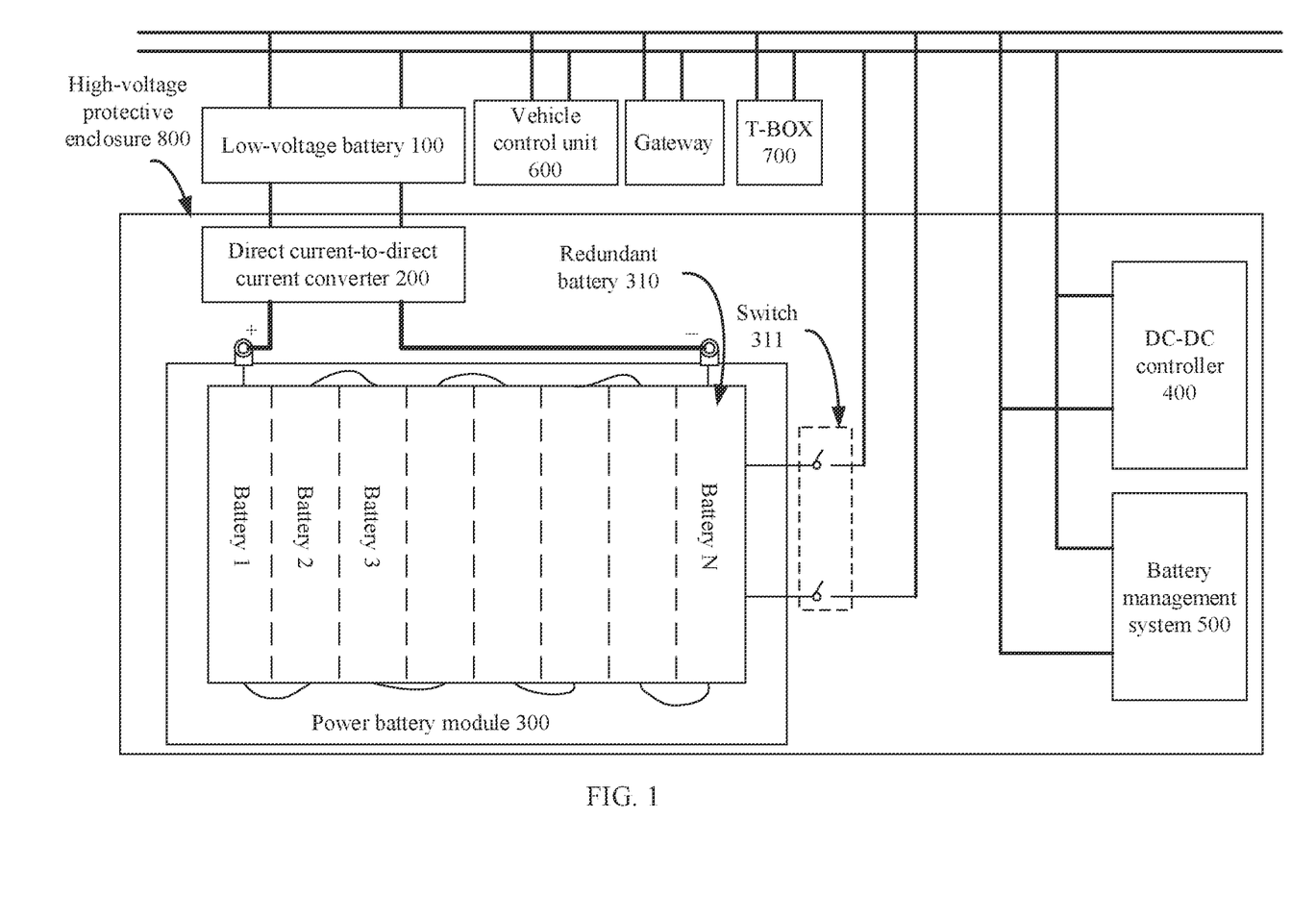
FIG. 1 is a schematic diagram of electrical connection of a charging system according to an embodiment of this application.

FIG. 1 is a schematic diagram of electrical connection of the charging system. For example, components may be electrically connected by using electric wires (such as copper wires or aluminum wires).

Figure 2:
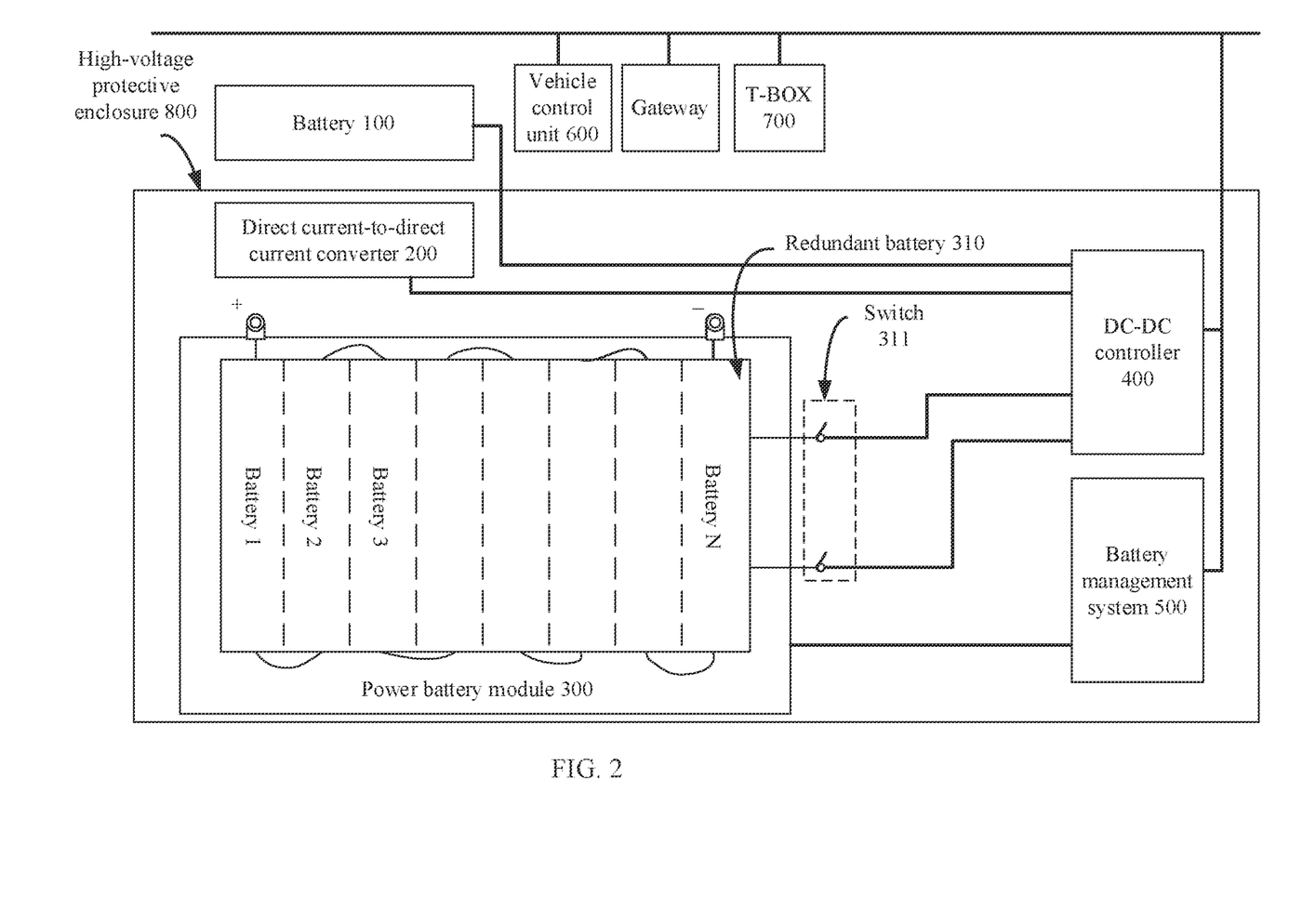
FIG. 2 is a schematic diagram of communicative connection of the charging system shown in FIG. 1.

FIG. 2 is a schematic diagram of communicative connection of the charging system. For example, the components may be communicatively connected by using a local interconnect network (LIN) bus, a controller area network (CAN) bus, a hardwire, or the like.

As shown in FIG. 1, the charging system may include a low-voltage battery 100, a direct current-to-direct current converter (DCDC) 200, a power battery module 300, and a DC-DC controller 400.

The low-voltage battery 100 may supply power to low-voltage electrical devices such as the DC-DC controller 400, a vehicle control unit (VCU) 600, a T-BOX 700, and a gateway in the vehicle. For example, a rated voltage of the low-voltage battery 100 may be 12 V.

The power battery module 300 may charge the low-voltage battery 100 when the vehicle is in a high-voltage power supply state. Herein, the high-voltage power supply state may also be referred to as a high-voltage power-on completed state, which is a state that the vehicle enters when a positive relay and a negative relay of the power battery module 300 have been closed. Herein, the action of closing the positive relay and the negative relay of the power battery module 300 may also be referred to as high-voltage power-on. In the high-voltage power supply state, the power battery module 300 may supply a high voltage (for example, 300 V to 400 V) for operation of high-voltage electrical devices (for example, the direct current-to-direct current converter and a driving motor of the vehicle) of the vehicle.

Certainly, it may be understood that whether a high-voltage electrical device operates depends on control of the high-voltage electrical device. Whether the direct current-to-direct current converter 200 operates is controlled by the DC-DC controller 400. For example, when the DC-DC controller 400 detects that the low-voltage battery 100 needs to be charged, the DC-DC controller 400 may control the direct current-to-direct current converter 200 to start operation. Specifically, refer to FIG. 1, the DC-DC controller 400 and the direct current-to-direct current converter 200 may be electrically connected, to control the direct current-to-direct current converter. For example, the DC-DC controller 400 may send an on instruction (or an off instruction) to the direct current-to-direct current converter, to control the direct current-to-direct current converter 200 to start operation (or stop operation). For example, the on instruction, the off instruction, or the like may be a control instruction of high and low levels or currents and voltages on different pins that is generated by the DC-DC controller 400, to start or stop or control the direct current-to-direct current converter 200.

As described above, the power battery module 300 may supply a high voltage for operation of the direct current-to-direct current converter 200, and the direct current-to-direct current converter 200 may convert the high voltage into a charging voltage of the low-voltage battery 100, so as to charge the low-voltage battery 100.

The DC-DC controller 400 may monitor a voltage of the low-voltage battery 100 when the vehicle is in a dormant state. Herein, the dormant state of the vehicle may also be referred to as a shut-off state of the vehicle. Specifically, the dormant state of the vehicle may indicate that the positive relay and the negative relay of the power battery module of the vehicle are open (not closed), and that the low-voltage electrical devices of the vehicle, such as the DC-DC controller, the direct current-to-direct current converter, the vehicle control unit, a battery management system, and the T-BOX, are in a low-power operating state. The low-power operating state of the low-voltage electrical devices may be a state in which only required functions of the low-voltage electrical devices are enabled, while optional functions are disabled. It may be understood that, in the manufacture or factory configuration of a vehicle, a person such as a vehicle designer who can set vehicle-related functions may configure required functions and optional functions of low-voltage electrical devices in the vehicle. For example, required functions of the DC-DC controller may include functions such as monitoring the voltage of the low-voltage battery, and sending a signal (for example, when the voltage of the low-voltage battery is lower than a threshold A1, the DC-DC controller may send a wake-up signal to another electrical device (such as the vehicle control unit)). Required functions of the vehicle control unit may include receiving a signal, analyzing the received signal, and when the received signal is a specific signal (such as the wake-up signal), switching from the low-power operating state and to a wake-up state. There are similar examples, and required functions of the electrical devices are not listed one by one herein. In a specific implementation, related personnel may configure the required functions of the electrical devices.

In contrast to the dormant state, the wake-up state may be a state in which both the required and optional functions are enabled.

Figure 3:
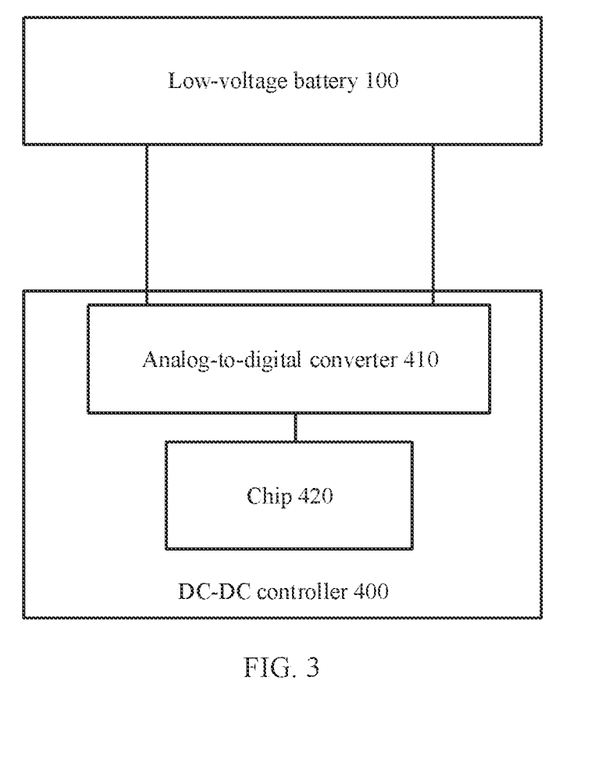
FIG. 3 is a schematic diagram of a structure of a DC-DC controller according to an embodiment of this application.

FIG. 3 shows a possible structure of the DC-DC controller 400. The DC-DC controller 400 may include an analog-to-digital converter (ADC) 410 and a chip 420. When the DC-DC controller 400 is in a low-power operating state, the analog-to-digital converter 410 and the chip 420 may keep operating. The analog-to-digital converter 410 is electrically connected to the low-voltage battery 100, so as to obtain the voltage of the low-voltage battery 100, and specifically, obtain a voltage analog signal of the low-voltage battery 100. The analog-to-digital converter 410 may convert the voltage analog signal into a voltage digital signal, and delivers the voltage digital signal to the chip 420. The chip 420 has data processing and data sending and receiving functions, and may determine, based on the voltage digital signal, whether the low-voltage battery 100 needs to be charged. Specifically, the threshold A1 may be set, and when the voltage of the low-voltage battery 100 is lower than the threshold A1, it may be determined that the low-voltage battery 100 needs to be charged. In an example, when the rated voltage of the low-voltage battery 100 is 12 V, the threshold A1 may be set to 9 V.

In some embodiments, when the DC-DC controller 400 determines that the voltage of the low-voltage battery 100 is lower than the threshold A1, the DC-DC controller 400 may enter a wake-up state and then control the direct current-to-direct current converter to start operation. For details, refer to the foregoing description, and details are not described herein again. At the same time, the DC-DC controller may wake up the battery management system (BMS) 500. Specifically, as shown in FIG. 2, the DC-DC controller 400 may be communicatively connected to the battery management system 500, and the DC-DC controller 400 may send a wake-up signal to the battery management system 500 to wake up the battery management system 500.

After being woken up, the battery management system 500 may control the positive relay and the negative relay of the power battery module 300 to be closed, so as to complete high-voltage power-on, such that the power battery module 300 may supply electric energy to the outside.

In some embodiments, before the battery management system 500 controls the positive relay and the negative relay of the power battery module 300 to be closed, the vehicle needs to determine whether the vehicle meets a high-voltage power-on condition. The vehicle control unit 600 may determine whether the vehicle meets the high-voltage power-on condition. Specifically, when the DC-DC controller 400 determines that the voltage of the low-voltage battery 100 is lower than the threshold A1, the DC-DC controller 400 may send a wake-up signal to the vehicle control unit 600 to wake up the vehicle control unit 600. After being woken up, the vehicle control unit 600 may determine, based on related information, whether the vehicle meets the high-voltage power-on condition.

In some embodiments, the high-voltage power-on condition may include the following three conditions: the direct current-to-direct current converter 200 is not faulty, the power battery module 300 is not faulty, and a state of charge (SOC) of the power battery module 300 is higher than a threshold A2 (the threshold A2 may be a preset value, for example, 15%). The DC-DC controller 400 may determine whether the direct current-to-direct current converter 200 is faulty, and sends a determining result to the vehicle control unit 600. The battery management system 500 may determine whether the power battery module 300 is faulty and whether the state of charge of the power battery module 300 is greater than the threshold A2, and sends a determining result to the vehicle control unit 600. For a specific determining process, refer to the description of the conventional technology, and details are not described herein.

In this embodiment of this application, during high-voltage power-on, there is no need to determine a state of a high-voltage connector, so that a high-voltage power-on state can be established as soon as possible. Specifically, in this embodiment of this application, as shown in FIG. 1, the direct current-to-direct current converter 200 and the power battery module 300 are housed in a same high-voltage protective enclosure 800. As such, the direct current-to-direct current converter 200 and the power battery module 300 may be connected directly without the high-voltage connector. It may be understood that if the direct current-to-direct current converter is disposed outside the high-voltage protective enclosure, a high voltage supplied by the power battery module needs to be directly output to the outside of the high-voltage protective enclosure. For safety reasons, the power battery module needs to be connected to the direct current-to-direct current converter via a high-voltage connector to avoid or reduce dangers caused by the high voltage. Therefore, the high-voltage power-on condition should also include a condition that the high-voltage connector is not faulty. However, in this embodiment of this application, the direct current-to-direct current converter 200 and the power battery module 300 are housed in the same high-voltage protective enclosure 800, and no high-voltage connector is required. Accordingly, the high-voltage power-on condition does not need to include the state of the high-voltage connector.

When the state of the vehicle meets the high-voltage power-on condition, the vehicle control unit 600 may send a high-voltage power-on instruction to the battery management system 500. The battery management system 500 may respond to the high-voltage power-on instruction and control the positive relay and negative relay of the power battery module 300 to be closed.

When the positive relay and the negative relay of the power battery module 300 are closed, the power battery module 300 may supply a high voltage to the direct current-to-direct current converter 200. The direct current-to-direct current converter 200 converts the high voltage into a charging voltage of the low-voltage battery 100, so as to charge the low-voltage battery 100.

In some embodiments, during charging of the low-voltage battery 100, the DC-DC controller 400 may monitor the voltage of the low-voltage battery 100 and determine whether the voltage of the low-voltage battery 100 increases to a threshold A3 within a preset duration T1. For example, the duration T1 may be a duration of 120 min, and the threshold A3 may be 12 V. If the voltage of the low-voltage battery 100 increases to the threshold A3 within the duration T1, the DC-DC controller 400 may determine that the charging succeeds. If the voltage of the low-voltage battery 100 does not increase to the threshold A3 within the duration T1, the DC-DC controller 400 may determine that the charging fails.

If the charging succeeds, the DC-DC controller 400 may send charging stop information to the battery management system 500. The battery management system 500 may respond to the charging stop information, open the positive relay and the negative relay of the power battery module 300, and enter a dormant state again. The DC-DC controller 400 may send the charging stop information to the vehicle control unit 600. The vehicle control unit 600 may respond to the charging stop information and enter the dormant state again. For example, before entering the dormant state, the vehicle control unit 600 may deliver a charging success message to the T-BOX through the gateway, and the T-BOX may report the charging success message to a cloud server or a user's mobile terminal. The mobile terminal may be pre-associated with the charging system of the vehicle. In this way, when the charging succeeds, the vehicle may notify the user that the charging of the low-voltage battery succeeds.

If the charging fails, the DC-DC controller 400 may send, to the vehicle control unit 600, charging failure information indicating that the charging fails. The vehicle control unit 600 may deliver the charging failure information to the T-BOX through the gateway. The T-BOX may send the charging failure information to the cloud server or to the user's mobile terminal. The mobile terminal may be pre-associated with the charging system of the vehicle. In this way, when the charging fails, the vehicle may notify the user in time, so that the user takes related measures manually, for example, replaces the low-voltage battery.

In some embodiments, the DC-DC controller 400 may monitor a state of the direct current-to-direct current converter 200 and report the state of the direct current-to-direct current converter 200 to the vehicle control unit 600. The battery management system 500 may monitor a state of the power battery module 300 and report the state of the power battery module 300 to the vehicle control unit 600. The vehicle control unit 600 may determine, based on the state of the direct current-to-direct current converter 200 and the state of the power battery module 300, whether the low-voltage battery 100 can continue to be charged. When the direct current-to-direct current converter 200 becomes faulty, or the power battery module 300 becomes faulty or the state of charge thereof is lower than the threshold A2, the vehicle control unit 600 determines that the low-voltage battery 100 cannot continue to be charged, and then may control the battery management system 500 to open the positive relay and the negative relay of the power battery module 300; and determines that the charging fails, and delivers a charging failure cause (the direct current-to-direct current converter 200 becomes faulty, or the power battery module 300 becomes faulty or the state of charge thereof is lower than the threshold A2) to the T-BOX through the gateway. The T-BOX may send the charging failure cause to the cloud server or to the user's mobile terminal, so that the user can take related measures in time, for example, charge the power battery module 300 of the vehicle.

For example, after the charging fails, the vehicle control unit 600 may further send a dormant state instruction to another low-voltage electrical device (for example, the battery management system 500), such that the low-voltage management system enters a dormant state.

In some embodiments, as shown in FIG. 1, the power battery module 300 may be composed of N batteries connected in series, where N is a positive integer. For example, it may be assumed that a rated voltage of the power battery module 300 is 360 V, and that a rated voltage of one of the N batteries is 12V. In this case, a value of N is 30. K batteries in the N batteries may be used as a redundant battery 310, and the K batteries are connected in series to obtain the redundant battery 310, where K is a positive integer. A maximum output voltage of the redundant battery 310 is less than or equal to a maximum withstand voltage of the low-voltage electrical device of the vehicle. For example, it may be assumed that the maximum withstand voltage of the low-voltage electrical device of the vehicle is 12 V. In this case, the maximum output voltage of the redundant battery 310 is also 12 V.

For example, one of the N batteries may be a lithium-ion battery. In an example, the lithium-ion battery may be composed of a plurality of (for example, three) lithium-ion battery cells connected in series.

As shown in FIG. 1, the redundant battery 310 is electrically connected to the low-voltage electrical device of the vehicle, so that when the low-voltage battery 100 has severely insufficient power and cannot supply electric energy to the low-voltage electrical device, the redundant battery 310 may be used to supply electric energy to the low-voltage electrical device. Specifically, as shown in FIG. 1 and FIG. 2, a switch 311 may be provided between the redundant battery 310 and the low-voltage electrical device. In a default state, or rather, when the low-voltage battery 100 can still supply electric energy to the low-voltage electrical device, the switch 311 is in an off state. When the voltage of the low-voltage battery 100 is lower than a threshold A4 (the threshold A4 is lower than the threshold A1, and the threshold A4 may be a preset value, for example, 8 V), the DC-DC controller 400 may control the switch 311 to on. Specifically, as shown in FIG. 2, the DC-DC controller 400 is communicatively connected to the switch 311, so as to send an on signal to the switch 311. The switch 311 may be on in response to the on signal, so that the low-voltage electrical devices such as the vehicle control unit and the battery management system can obtain electric energy from the redundant battery. This can avoid a situation in which the low-voltage electrical devices such as the vehicle control unit and the battery management system cannot work due to the severely insufficient power of the low-voltage battery 100.

According to the charging system provided in this embodiment of this application, the voltage of the low-voltage battery can be monitored in real time when the vehicle is in a dormant state; and when the voltage of the low-voltage battery is relatively low, a related controller can be woken up to perform high-voltage power-on, so as to charge the low-voltage battery. In addition, there are few high-voltage power-on conditions, and high-voltage power-on can be performed as soon as possible; and few electrical devices are woken up to charge the low-voltage battery, which can save electric energy. In addition, the redundant battery is provided and may supply electric energy to the low-voltage electrical device when the low-voltage battery has severely insufficient power, thereby avoiding a situation in which the vehicle cannot be started or the related controller of the vehicle cannot be woken up.

Figure 4:
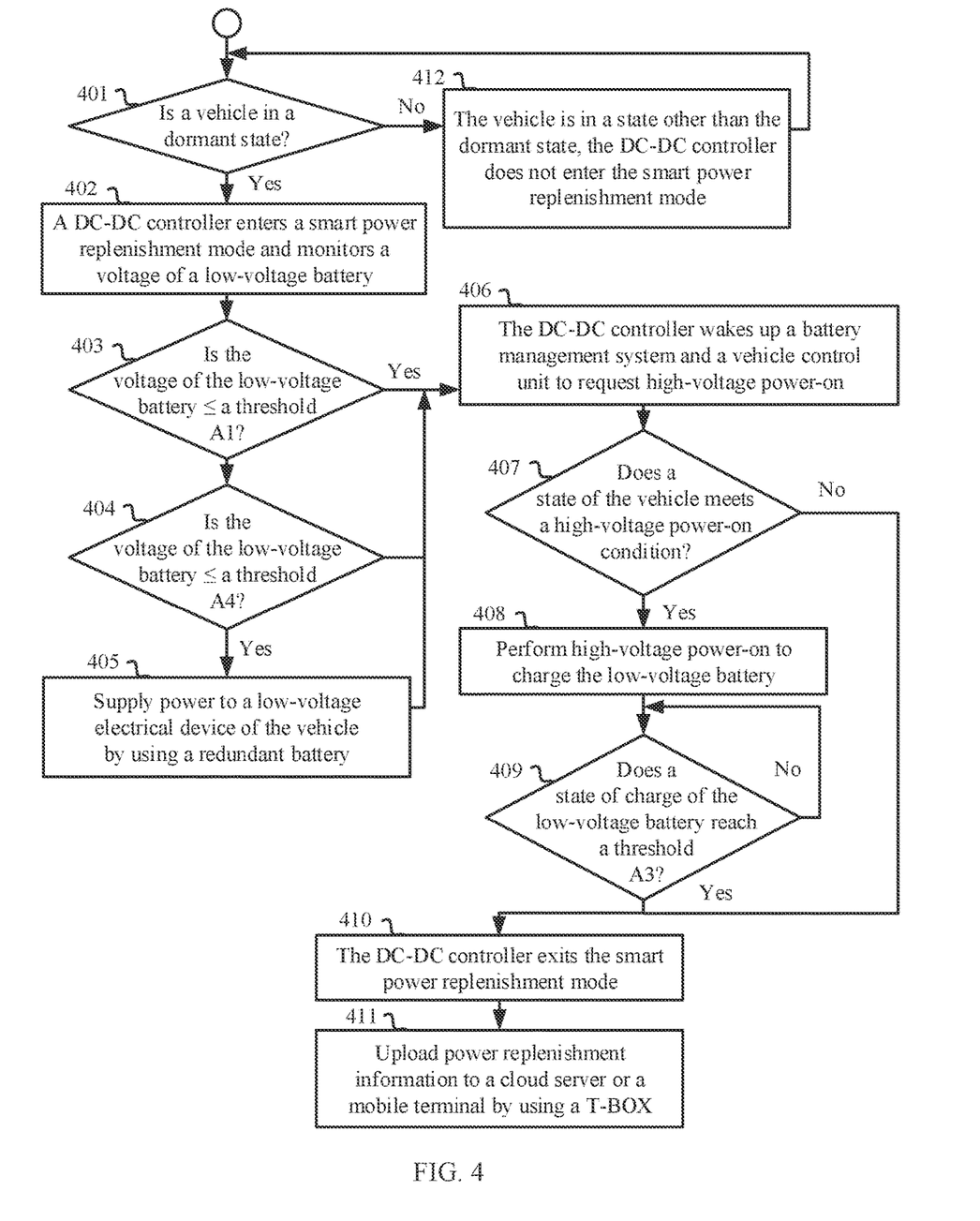
FIG. 4 is a flowchart of a low-voltage battery charging method according to an embodiment of this application.

Based on the charging system shown in FIG. 1 and FIG. 2, an embodiment of this application provides a low-voltage battery charging method. Refer to FIG. 4, the method may include the following steps.

Step 401: Determine whether a vehicle is in a dormant state. For example, step 401 may be performed by a DC-DC controller. In this embodiment of this application, the DC-DC controller may be continuously in an operating state or in a low-power operating state. As described above, the dormant state indicates that a positive relay and a negative relay of a power battery module of the vehicle are open (not closed), and that low-voltage electrical devices of the vehicle, such as the DC-DC controller, a direct current-to-direct current converter, a vehicle control unit, a battery management system, and a T-BOX, are in a low-power operating state. For example, for the vehicle control unit, sending a heartbeat packet is an optional function. In other words, the vehicle control unit in a wake-up state may send the heartbeat packet, while the vehicle control unit in the low-power operating state does not send the heartbeat packet. Therefore, the DC-DC controller and the vehicle control unit in the wake-up state may notify each other by using the heartbeat packet that they are in the wake-up state. When the DC-DC controller does not receive, within a specific duration (for example, 2 seconds), the heartbeat packet sent by the vehicle control unit, the DC-DC controller may determine that the vehicle control unit is in a low-power operating state, and may determine that the vehicle is in the dormant state. It may be understood that, for the vehicle, when the vehicle control unit is in the low-power operating state, other low-voltage electrical devices are usually also in the low-power operating state. Therefore, when the DC-DC controller determines that the vehicle control unit is in a low-power operating state, it may be determined that the vehicle is in the dormant state.

When the vehicle is in the dormant state, the DC-DC controller may perform step 402 to enter a smart power replenishment mode and monitor a voltage of the low-voltage battery. The smart power replenishment mode of the DC-DC controller is an operating mode in which the DC-DC controller continuously monitors the voltage of the low-voltage battery and when the voltage is lower than a threshold A1, wakes up a related component to replenish power for the low-voltage battery. It may be understood that the method shown in FIG. 4 may be implemented by invoking a software program. The DC-DC controller entering the smart power replenishment mode may be understood as the DC-DC controller starting to execute the software program.

The DC-DC controller may perform step 403 of determining whether the voltage of the low-voltage battery is lower than or equal to the threshold A1 (for example, 9 V). If the voltage is lower than or equal to the threshold A1, the DC-DC controller may perform step 406. Step 406 is specifically described in the following, and details are not described here.

When it is determined that the voltage of the low-voltage battery is lower than the threshold A1, step 404 of determining whether the voltage of the low-voltage battery is lower than or equal to a threshold A4 may be further performed. The threshold A4 is less than the threshold A1. For example, the threshold A1 may be 9 V, and the threshold A4 may be 8 V.

When the voltage of the low-voltage battery is lower than the threshold A4, the DC-DC controller may perform step 405 of supplying power to a low-voltage electrical device of the vehicle by using a redundant battery. Specifically, refer to FIG. 1 and FIG. 2, the DC-DC controller controls the switch 311 to be on, so that the redundant battery 310 can supply power to the low-voltage electrical devices such as the vehicle control unit, the battery management system, and the DC-DC controller.

As described above, when the voltage of the low-voltage battery is lower than or equal to the threshold A1, the DC-DC controller may perform step 406 in which the DC-DC controller wakes up the battery management system and the vehicle control unit to request high-voltage power-on. After being woken up, the battery management system may control the positive relay and the negative relay of the power battery module to be closed, so as to complete high-voltage power-on.

In some embodiments, as shown in FIG. 4, before the battery management system controls the positive relay and the negative relay of the power battery module to be closed, the vehicle control unit may perform step 407 of determining whether a state of the vehicle meets a high-voltage power-on condition. For a specific implementation process of step 407, refer to the foregoing description, and details are not described herein again.

When the state of the vehicle meets the high-voltage power-on condition, the battery management system may perform step 408 of controlling the positive relay and the negative relay of the power battery module to be closed to complete high-voltage power-on, so as to charge the low-voltage battery.

During charging of the low-voltage battery, the DC-DC controller may perform step 409 of determining whether a state of charge of the low-voltage battery reaches a threshold A3. For example, for a low-voltage battery having a rated voltage of 12 V, the threshold A3 may be 12 V.

When the state of charge of the low-voltage battery reaches the threshold A3, the DC-DC controller may perform step 410 of exiting the smart power replenishment mode.

For example, after power replenishment succeeds, the vehicle control unit may perform step 411 of uploading power replenishment information to a cloud server or a mobile terminal by using the T-BOX. The power replenishment information may be the charging success message described above.

For example, after power replenishment succeeds, the battery management system may control the positive relay and the negative relay of the power battery module to be open, so as to complete high-voltage power-off. The vehicle control unit may indicate the low-voltage electrical devices such as the DC-DC controller, the battery management system, the gateway, and the T-BOX to enter a low-power operating state, and the vehicle control unit itself also enters a low-power operating state. Therefore, after power replenishment succeeds, the vehicle may enter the dormant state again.

In some embodiments, returning to step 401, when the vehicle is not in the dormant state, the DC-DC controller may not enter the smart power replenishment mode. It should be noted that the vehicle not being in the dormant state may mean that the vehicle is in a state in which the low-voltage battery is being charged (that is, a state corresponding to charging of the low-voltage battery). In this case, the DC-DC controller has already been in the smart power replenishment mode, and therefore the DC-DC controller does not need to repeatedly enter the smart power replenishment mode. The vehicle not being in the dormant state may mean that the vehicle is not in a shut-off state. For example, the vehicle is traveling; or the vehicle is not traveling, but electrical devices of the vehicle, such as an air conditioner or a lamplight, are in an operating state. In this case, the DC-DC controller does not enter the smart power replenishment mode.

According to the charging method provided in this embodiment of this application, the voltage of the low-voltage battery can be monitored in real time when the vehicle is in a dormant state; and when the voltage of the low-voltage battery is relatively low, a related controller can be woken up to perform high-voltage power-on, so as to charge the low-voltage battery. In addition, there are few high-voltage power-on conditions, and high-voltage power-on can be performed as soon as possible; and few electrical devices are woken up to charge the low-voltage battery, which can save electric energy. In addition, the redundant battery is provided and may supply electric energy to the low-voltage electrical device when the low-voltage battery has severely insufficient power, thereby avoiding a situation in which the vehicle cannot be started or the related controller of the vehicle cannot be woken up.

In addition, according to the charging system and method provided in embodiments of this application, it is only required to determine whether the direct current-to-direct current converter is faulty, whether the power battery module is faulty, and whether electric energy is sufficient, and then high-voltage power-on may be performed. Therefore, even when some high-voltage components (such as a driving motor) become faulty, high-voltage power-on can be completed, and the low-voltage battery can be charged properly, which improves the reliability of charging.

According to the charging system and method provided in embodiments of this application, one or more batteries in the power battery module are used as the redundant battery corresponding to the low-voltage battery. When the low-voltage battery has severely insufficient power, the redundant battery may supply power to the low-voltage electrical devices such as the vehicle control unit and the battery management system, thereby avoiding the problem that high-voltage power-on cannot be performed because the low-voltage battery has severely insufficient power.

According to the charging system and method provided in embodiments of this application, the voltage of the low-voltage battery may be monitored in real time, so that a charging process of the low-voltage battery may be performed only when the low-voltage battery needs to be charged, thereby reducing energy consumption caused by charging of the low-voltage battery, and reducing a risk of severe power insufficiency of the low-voltage battery.

Finally, it should be noted that the foregoing embodiments are merely used to describe the technical solutions of this application, but are not intended to limit this application. Although this application is described in detail with reference to the foregoing embodiments, persons of ordinary skill in the art should understand that they may still make modifications to the technical solutions described in the foregoing embodiments or make equivalent replacements to some technical features thereof, without departing from the scope of the technical solutions of embodiments of this application.

What is claimed is:

1. A charging system, configured in a vehicle, wherein the charging system comprises:
   a low-voltage battery capable of supplying power to a low-voltage electrical device of the vehicle;
   a power battery module comprising a plurality of power batteries connected in series;

a direct current-to-direct current (DC-DC) converter capable of receiving a voltage supplied by the power battery module in response to at least that a positive relay and a negative relay of the power battery module are closed, and converting the voltage into a charging voltage of the low-voltage battery to charge the low-voltage battery, wherein the power battery module and the DC-DC converter are housed in a same high-voltage protective enclosure; and a DC-DC controller electrically connected to the low-voltage battery and capable of monitoring a voltage of the low-voltage battery in response to at least that the vehicle is in a dormant state, wherein:

the DC-DC controller is communicatively connected to a battery management system (BMS) of the vehicle, to wake up the BMS in response to at least that the voltage of the low-voltage battery is lower than a first threshold and to cause the BMS to close the positive relay and the negative relay, wherein a first power battery in the plurality of power batteries is configured to supply power to the low-voltage electrical device of the vehicle in response to at least that the voltage of the low-voltage battery is lower than a third threshold;

the DC-DC controller is communicatively connected to a vehicle control unit of the vehicle, to wake up the vehicle control unit in response to at least that the voltage of the low-voltage battery is lower than the first threshold;

the vehicle control unit is configured to: monitor a state of the vehicle, and in response to at least that the state of the vehicle meets a high-voltage power-on condition, send a high-voltage power-on instruction to the BMS;

the BMS closes the positive relay and the negative relay in response to the high-voltage power-on instruction;

the high-voltage power-on condition is that the DC-DC converter is not faulty, the power battery module is not faulty, and a state of charge (SOC) of the power battery module is higher than a second threshold; and the DC-DC controller is electrically connected to the DC-DC converter to monitor whether the DC-DC converter becomes faulty.

2. The charging system according to claim 1, wherein the power battery module is composed of the plurality of power batteries connected in series.

3. The charging system according to claim 2, wherein the first power battery is composed of K batteries in the plurality of power batteries connected in series, and a maximum output voltage of the first power battery is less than or equal to a maximum withstand voltage of the low-voltage electrical device, wherein K≥1, and K is an integer.

4. The charging system according to claim 3, wherein an electrical switch is disposed between the first power battery and the low-voltage electrical device of the vehicle, wherein in response to at least that the voltage of the low-voltage battery is lower than the first threshold, the electrical switch is closed to cause the first power battery to supply power to the low-voltage electrical device of the vehicle.

5. The charging system according to claim 4, wherein the DC-DC controller is further configured to: in response to at least that the low-voltage battery is charged, monitor the voltage of the low-voltage battery, to monitor whether a fault occurs in charging of the low-voltage battery.

6. The charging system according to claim 1, wherein one of the plurality of power batteries is a lithium-ion battery comprising lithium-ion battery cells connected in series.

7. The charging system according to claim 1, wherein the DC-DC controller is configured to: in response to at least that the low-voltage battery is charged, send charging stop information to the BMS.

8. The charging system according to claim 7, wherein the BMS is configured to: in response to the charging stop information, open the positive relay and the negative relay.

9. A vehicle, comprising a charging system, wherein the charging system comprises:

a low-voltage battery capable of supplying power to a low-voltage electrical device of the vehicle;

a power battery module comprising a plurality of power batteries connected in series;

a direct current-to-direct current (DC-DC) converter capable of receiving a voltage supplied by the power battery module in response to at least that a positive relay and a negative relay of the power battery module are closed, and converting the voltage into a charging voltage of the low-voltage battery to charge the low-voltage battery, wherein the power battery module and the DC-DC converter are housed in a same high-voltage protective enclosure; and a DC-DC controller electrically connected to the low-voltage battery and capable of monitoring a voltage of the low-voltage battery in response to at least that the vehicle is in a dormant state, wherein:

the DC-DC controller is communicatively connected to a battery management system (BMS) of the vehicle, to wake up the BMS in response to at least that the voltage of the low-voltage battery is lower than a first threshold and to cause the BMS to close the positive relay and the negative relay, wherein a first power battery in the plurality of power batteries is configured to supply power to the low-voltage electrical device of the vehicle in response to at least that the voltage of the low-voltage battery is lower than a third threshold;

the DC-DC controller is communicatively connected to a vehicle control unit of the vehicle, to wake up the vehicle control unit in response to at least that the voltage of the low-voltage battery is lower than the first threshold;

the vehicle control unit is configured to: monitor a state of the vehicle, and in response to at least that the state of the vehicle meets a high-voltage power-on condition, send a high-voltage power-on instruction to the BMS;

the BMS closes the positive relay and the negative relay in response to the high-voltage power-on instruction;

the high-voltage power-on condition is that the DC-DC converter is not faulty, the power battery module is not faulty, and a state of charge (SOC) of the power battery module is higher than a second threshold; and the DC-DC controller is electrically connected to the DC-DC converter to monitor whether the DC-DC converter becomes faulty.

10. A method for low voltage battery charging, applied to a charging system in a vehicle, wherein the charging system comprises a low-voltage battery, a power battery module comprising a plurality of power batteries connected in series, a direct current-to-direct current (DC-DC) converter, and a DC-DC controller; and the method comprises:

monitoring, by the DC-DC controller, a voltage of the low-voltage battery in response to at least that the vehicle is in a dormant state;

waking up, by the DC-DC controller, a battery management system (BMS) of the vehicle in response to at least that the voltage of the low-voltage battery is lower than a first threshold to cause the BMS to close a positive relay and a negative relay of the power battery module, and the power battery module charges the low-voltage battery via the DC-DC converter, wherein the power battery module and the DC-DC converter are housed in a same high-voltage protective enclosure;

controlling, by the DC-DC controller, a first power battery in the plurality of power batteries to supply power to a low-voltage electrical device of the vehicle in response to at least that the voltage of the low-voltage battery is lower than a third threshold;

waking up, by the DC-DC controller, a vehicle control unit of the vehicle to cause the vehicle control unit to send a high-voltage power-on instruction to the BMS in response to at least that the vehicle meets a high-voltage power-on condition, wherein the high-voltage power-on condition is that the DC-DC converter is not faulty, the power battery module is not faulty, and a state of charge (SOC) of the power battery module is higher than a second threshold;

closing, by the BMS, the positive relay and the negative relay in response to the high-voltage power-on instruction;

monitoring, by the DC-DC controller, the SOC of the low-voltage battery in response to at least that the low-voltage battery is in a charging state; and in response to at least that the SOC of the low-voltage battery is greater than or equal to a preset charging stop threshold, sending, by the DC-DC controller, charging stop information to the BMS to cause the BMS to open the positive relay and the negative relay.

11. The method according to claim 10, wherein the power battery module is composed of the plurality of power batteries connected in series; and the first power battery is composed of K batteries in the plurality of power batteries connected in series, and a maximum output voltage of the first power battery is less than or equal to a maximum withstand voltage of the low-voltage electrical device, wherein K≥1, and K is an integer; and the third threshold is lower than the first threshold.

12. The vehicle according to claim 9, wherein the power battery module is composed of the plurality of power batteries connected in series.

13. The vehicle according to claim 12, wherein the first power battery is composed of K batteries in the plurality of power batteries connected in series, and a maximum output voltage of the first power battery is less than or equal to a maximum withstand voltage of the low-voltage electrical device, wherein K≥1, and K is an integer.

14. The vehicle according to claim 13, wherein an electrical switch is disposed between the first power battery and the low-voltage electrical device of the vehicle, wherein in response to at least that the voltage of the low-voltage battery is lower than the first threshold, the electrical switch is closed to cause the first power battery to supply power to the low-voltage electrical device of the vehicle.

15. The vehicle according to claim 9, wherein one of the plurality of power batteries is a lithium-ion battery comprising lithium-ion battery cells connected in series.

16. The vehicle according to claim 9, wherein the DC-DC controller is configured to: in response to at least that the low-voltage battery is charged, send charging stop information to the BMS.

17. The vehicle according to claim 16, wherein the BMS is configured to: in response to the charging stop information, open the positive relay and the negative relay.

18. The method according to claim 10, wherein one of the plurality of power batteries is a lithium-ion battery comprising lithium-ion battery cells connected in series.

19. The method according to claim 10, further comprising:

sending, by the DC-DC controller, charging stop information to the BMS in response to at least that the low-voltage battery is charged.

20. The method according to claim 19, further comprising:

opening, by the BMS, the positive relay and the negative relay in response to the charging stop information.

* * * * *